(12) United States Patent
Kim et al.

(10) Patent No.: US 11,824,152 B2
(45) Date of Patent: Nov. 21, 2023

(54) APPARATUS AND METHOD FOR MANUFACTURING UNIT CELL

(71) Applicant: LG CHEM, LTD., Seoul (KR)

(72) Inventors: Duck Hoe Kim, Daejeon (KR); Cha Hun Ku, Daejeon (KR); Dae Bong Lim, Daejeon (KR); Soon Kwan Kwon, Daejeon (KR); Hyun Kyung Shin, Daejeon (KR); Ju Hyeon Cho, Daejeon (KR); Ji Su An, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 542 days.

(21) Appl. No.: 17/257,249

(22) PCT Filed: Jan. 2, 2020

(86) PCT No.: PCT/KR2020/000054
§ 371 (c)(1),
(2) Date: Dec. 30, 2020

(87) PCT Pub. No.: WO2020/141903
PCT Pub. Date: Jul. 9, 2020

(65) Prior Publication Data
US 2021/0234186 A1 Jul. 29, 2021

(30) Foreign Application Priority Data
Jan. 2, 2019 (KR) .................. 10-2019-0000436

(51) Int. Cl.
*H01M 10/04* (2006.01)
*H01M 10/0585* (2010.01)

(52) U.S. Cl.
CPC ... *H01M 10/0404* (2013.01); *H01M 10/0585* (2013.01)

(58) Field of Classification Search
CPC ......... B29C 65/18; B29C 65/48; B29C 65/56; B29C 65/7802; B29C 65/7847;
(Continued)

(56) References Cited

U.S. PATENT DOCUMENTS

2014/0026400 A1  1/2014  Yuhara et al.

FOREIGN PATENT DOCUMENTS

| EP | 2 879 223 A1 | 6/2015 |
| JP | 2009-9919 A | 1/2009 |

(Continued)

OTHER PUBLICATIONS

English translation of KR 2019-0000436.*
(Continued)

*Primary Examiner* — Sonya M Sengupta
(74) *Attorney, Agent, or Firm* — Birch, Stewart, Kolasch & Birch, LLP (57) ABSTRACT

Discussed is an apparatus for manufacturing a unit cell of a battery, the apparatus including: a center electrode reel from which a center electrode is unwound; an upper separator reel from which an upper separator laminated on a top surface of the center electrode is unwound; a lower separator reel from which a lower separator laminated on a bottom surface of the center electrode is unwound; and a magnetic force generation part disposed above or below a first laminate to apply magnetic force to the first laminate, the first laminate including the lower separator, the center electrode, and the upper separator that are sequentially laminated.

15 Claims, 7 Drawing Sheets

(58) Field of Classification Search
CPC ..... B29C 65/80; B29C 66/1122; B29C 66/21;
B29C 66/433; B29C 66/81267; B29C
66/81429; B29C 66/83543; B29C
66/9672; Y10T 29/49112; Y10T
29/53135; Y02E 60/10; Y02P 70/50;
H01M 10/0404; H01M 10/0463; H01M
10/0525; H01M 10/058; H01M 10/0585;
H01M 50/46; B29L 2031/3468
See application file for complete search history.

(56) References Cited

FOREIGN PATENT DOCUMENTS

| | | |
|---|---|---|
| JP | 2012-209054 A | 10/2012 |
| JP | 2017-27889 A | 2/2017 |
| JP | 2017-91700 A | 5/2017 |
| KR | 10-2009-0030175 A | 3/2009 |
| KR | 10-2015-0035271 A | 4/2015 |
| KR | 10-2015-0136319 A | 12/2015 |
| KR | 10-2016-0075096 A | 6/2016 |
| KR | 10-2016-0094182 A | 8/2016 |
| KR | 10-2017-0118322 A | 10/2017 |
| WO | WO 2018/070701 A1 | 4/2018 |

OTHER PUBLICATIONS

Extended European Search Report for European Application No. 20736135.3, dated Jul. 2, 2021.
International Search Report for PCT/KR2020/000054 (PCT/ISA/210) dated Apr. 14, 2020.

* cited by examiner

APPARATUS AND METHOD FOR MANUFACTURING UNIT CELL

CROSS-REFERENCE TO RELATED APPLICATION

The present application claims the benefit of the priority of Korean Patent Application No. 10-2019-0000436, filed on Jan. 2, 2019, which is hereby incorporated by reference in its entirety.

TECHNICAL FIELD

The present invention relates to an apparatus and method for manufacturing a unit cell, and more particularly, to an apparatus and method for manufacturing a unit cell, which are capable of aligning a center electrode at a regular position in a non-contact manner even if it is not grasped from the outside when the center electrode is separated from the regular position.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

One electrode assembly is formed by assembling unit cells, each of which is formed by laminating a cathode, a separator, and an anode. Then, the electrode assembly is accommodated in a specific case to manufacture a lithium secondary battery.

The unit cells include full-cells and bi-cells. Each of the full-cells is a cell in which a cathode and an anode are disposed at both the outermost portions of the cell. As the most basic structure, the full-cell includes a full-cell having a structure of a cathode/separator/anode or a structure of a cathode/separator/anode/separator/cathode/separator/anode.

Each of the bi-cells is a cell in which electrodes having the same polarity are disposed on both the outermost portions of the cell. As the most basic structure, the bi-cell includes an A type bi-cell having a cathode/separator/anode/separator/cathode or a C type bi-cell having a structure of an anode/separator/cathode/separator/anode. That is, a cell in which a cathode is disposed at each of both the outermost sides is referred to as an A-type bi-cell, and a cell in which an anode is disposed at each of both the outermost sides is referred to as a C-type bi-cell.

In general, in order to manufacture such a unit cell, while a center electrode moves to one side by a conveyor belt or the like, a separator is laminated on each of top and bottom surfaces of the center electrode, and then, an upper electrode and a lower electrode are further laminated. If the unit cell is the bi-cell, the center electrode may be provided in an odd number such as one, and if the unit cell is the full-cell, the center electrode may be provided in an even number such as two. However, in some cases, the center electrode may be separated by a rotational movement or a linear movement from an original position to be aligned. If, before the separator is laminated on each of the top and bottom surfaces of the center electrode, the state of the center electrode may be easily grasped from the outside. However, when the center electrode is separated from the regular position while the separator is laminated on each of the top and bottom surfaces of the center electrode, the separator hides the center electrode, and thus, there is a problem that it is not easy to grasp the state of the center electrode from the outside. In addition, when the unit cell is manufactured in the state in which the center electrode is separated from the regular position, there is a risk that problems such as capacity reduction, short circuit, and the like occur in the secondary battery including the unit cell.

DISCLOSURE OF THE INVENTION

Technical Problem

An object of the present invention for solving the above problems is to provide an apparatus and method for manufacturing a unit cell, which are capable of aligning a center electrode at a regular position in a non-contact manner even if it is not grasped from the outside when the center electrode is separated from the regular position.

The objects of the present invention are not limited to the aforementioned object, but other objects not described herein will be clearly understood by those skilled in the art from descriptions below.

Technical Solution

An apparatus for manufacturing a unit cell according to an embodiment of the present invention for solving the above problems includes: a center electrode reel from which a center electrode is unwound; an upper separator reel from which an upper separator laminated on a top surface of the center electrode is unwound; a lower separator reel from which a lower separator laminated on a bottom surface of the center electrode is unwound; and a magnetic force generation part disposed above or below a first laminate, in which the lower separator, the center electrode, and the upper separator are sequentially laminated, to apply magnetic force to the first laminate.

Also, the magnetic force generation part may be provided as an electromagnet configured to generate the magnetic force when current flows therethrough.

Also, when the first laminate moves to one side so that the center electrode is disposed above or below the magnetic force generation part, the current may flow through the magnetic force generation part.

Also, when the center electrode is disposed at a regular position to be aligned above or below the magnetic force generation part, the current may flow through the magnetic force generation part so as to attract the center electrode.

Also, when a specific time elapses after the current flows through the magnetic force generation part, the current may be cut off.

Also, the specific time may be 0.01 seconds to 0.5 seconds.

Also, the magnetic force generation part may include: a rotating rotation body having a cylindrical shape; and a plurality of magnets disposed on an outer circumferential surface of the rotation body and disposed at uniform intervals.

Also, the rotation body may rotate in the same direction as a direction in which the first laminate moves to one side.

Also, the rotation body may rotate in the same speed as a speed in which the first laminate moves to one side.

Also, the intervals may be the same intervals between the regular positions at which the plurality of center electrodes are aligned.

Also, the apparatus may further include: an upper electrode reel from which the upper electrode laminated on a top surface of the first laminate is unwound; a lower electrode reel from which the lower electrode laminated on a bottom of the first laminate is unwound; and a laminator configured to laminates a second laminate in which the lower electrode, the lower separator, the center electrode, the upper separator, and the upper electrode 1121 are sequentially laminated.

A method for manufacturing a unit cell according to an embodiment of the present invention for solving the above problems includes: a step of cutting a center electrode that is unwound from a center electrode reel; a step of laminating a separator on each of top and bottom surfaces of the center electrode to form a first laminate; and a step of applying magnetic force to the first laminate from a magnetic force generation part disposed above or below the first laminate to align the center electrode at a regular position.

Also, the magnetic force generation part may be provided as an electromagnet configured to generate the magnetic force when current flows therethrough.

Also, the magnetic force generation part may include: a rotating rotation body having a cylindrical shape; and a plurality of magnets disposed on an outer circumferential surface of the rotation body and disposed at uniform intervals.

Also, the method may further include: a step of further laminating an upper electrode and a lower electrode on top and bottom surfaces of the first laminate, respectively, to form a second laminate; and a step of laminating the second laminate.

Particularities of other embodiments are included in the detailed description and drawings.

Advantageous Effects

The embodiments of the present invention may have at least the following effects.

When the center electrode is separated from the regular position while the unit cell is manufactured, the center electrode may be aligned at the regular position by using magnetic force even if it is not grasped from the outside.

In addition, since the center electrode is disposed at the regular position in the non-contact manner in which the contact of the center electrode is not required, the center electrode may be prevented from being damaged.

The effects of the prevent invention are not limited by the aforementioned description, and thus, more varied effects are involved in this specification.

MODE FOR CARRYING OUT THE INVENTION

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

Figure 1:
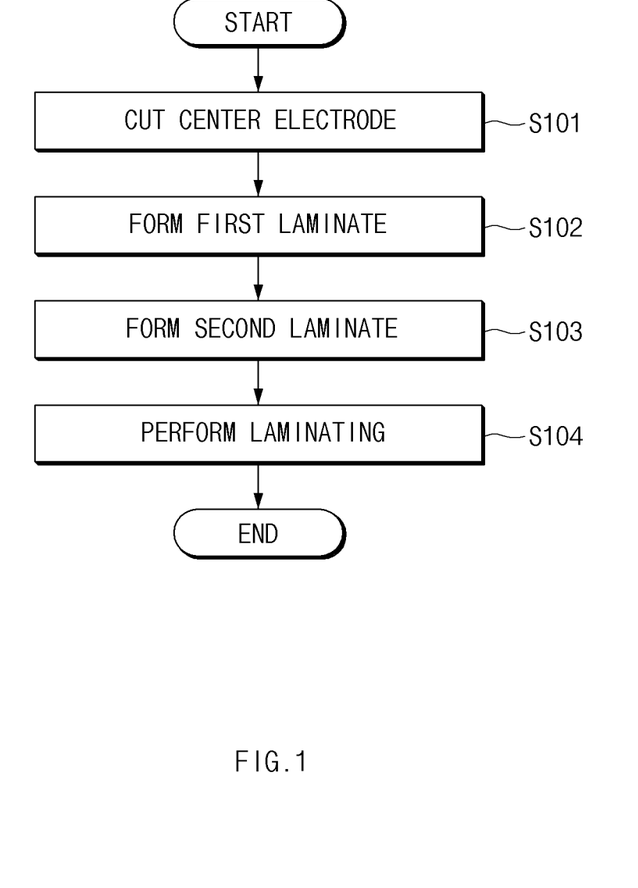
FIG. 1 is a flowchart illustrating a method for manufacturing a unit cell according to an embodiment of the present invention.

FIG. 1 is a flowchart illustrating a method for manufacturing a unit cell 2 according to an embodiment of the present invention.

According to an embodiment of the present invention, in a process of manufacturing the unit cell 2, when a center electrode 1111 is separated (off-centered or misaligned) from a regular position (desired position or a perpendicular position), the center electrode 1111 may be aligned at the regular position by using magnetic force even if it is not grasped from the outside. In addition, since the center electrode 1111 is disposed at the regular position in a non-contact manner in which contact of the center electrode 1111 is not required, the center electrode 1111 may be prevented from being damaged.

For this, the method for manufacturing the unit cell 2 according to an embodiment of the present invention includes: a step of cutting the center electrode 1111 that is unwound from a center electrode reel 111; a step of laminating a separator 12 on each of top and bottom surfaces of the center electrode 1111 to form a first laminate 21; and a step of applying magnetic force to the first laminate 21 from a magnetic force generation part 14 disposed above or below the first laminate 21 to align the center electrode 1111 at the regular position.

Hereinafter, each of the steps illustrated in the flowchart of FIG. 1 will be described with reference to FIGS. 2 to 6.

Figure 2:
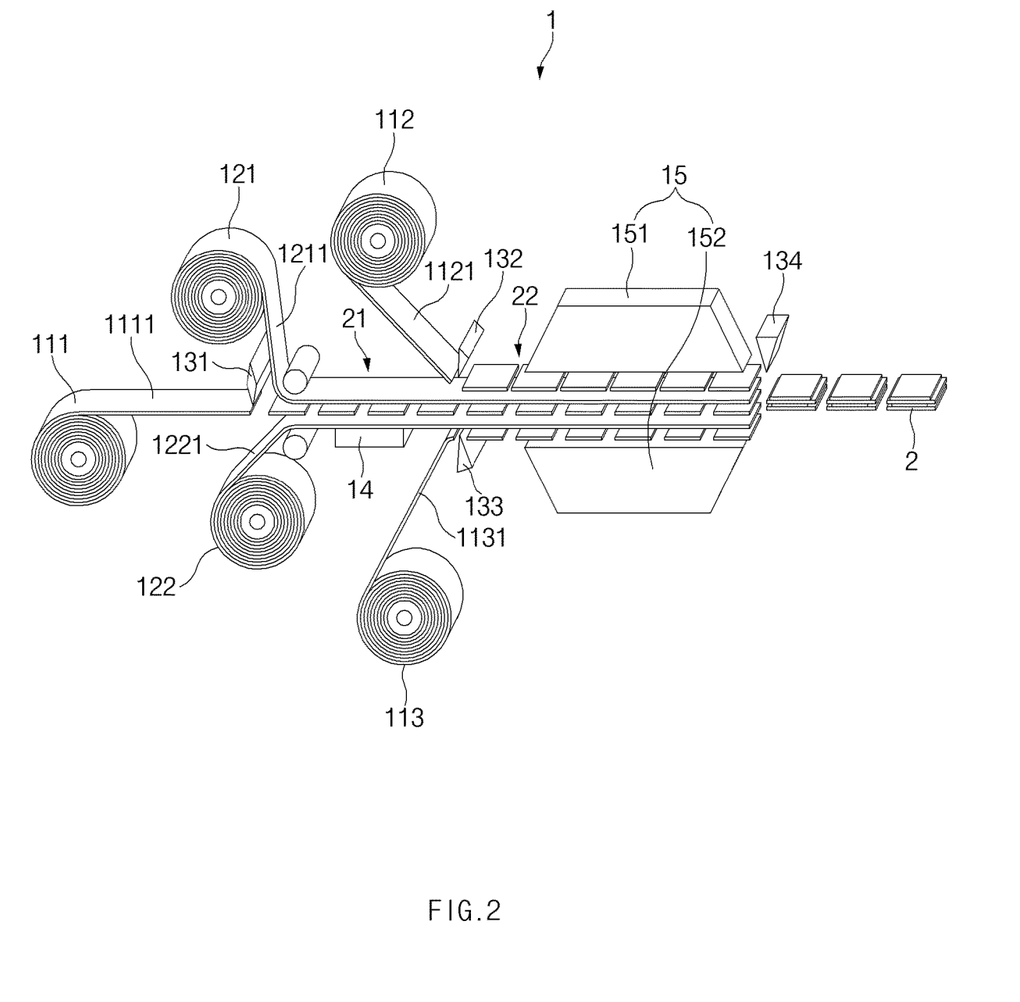
FIG. 2 is a schematic view illustrating an apparatus for manufacturing a unit cell according to an embodiment of the present invention.

FIG. 2 is a schematic view illustrating an apparatus 1 for manufacturing a unit cell according to an embodiment of the present invention.

The apparatus 1 for manufacturing a unit cell according to an embodiment of the present invention includes: a center electrode reel 111 from which a center electrode 1111 is unwound; an upper separator reel 121 from which an upper separator 1211 laminated on a top surface of the center electrode 1111 is unwound; a lower separator reel 122 from which a lower separator 1221 laminated on a bottom surface of the center electrode 1111 is unwound; and a magnetic force generation part 14 disposed above or below the first laminate 21, in which the lower separator 1221, the center electrode 1111, and the upper separator 1211 are sequentially laminated, to apply magnetic force to the first laminate 21.

As described above, the unit cell 2 is provided as at least one of a full-cell and a bi-cell. As described above, if the unit cell 2 is the bi-cell, the center electrode 1111 may be provided in an odd number, and if the unit cell 2 is the full-cell, the center electrode 1111 may be provided in an even number. Hereinafter, the unit cell 2 may be a bi-cell in which three electrodes and two separators 12 are provided. However, this is for convenience of description and is not intended to limit the scope of rights.

The center electrode reel 111 may be a reel around which the center electrode 1111 is wound, and the center electrode 1111 may be unwound from the center electrode reel 111. If the unit cell 2 is an A type bi-cell, the center electrode 1111 may be provided as an anode, and if the unit cell 2 is a C type bi-cell, the center electrode 1111 may be provided as a cathode. Slurry of an electrode active material, a conductive material, and a binder may be applied on an electrode collector and then be dried and pressed to manufacture the electrode. Here, since the electrode collector is made of a magnetic material such as aluminum (Al), copper (Cu) or nickel (Ni), the electrode collector is relatively affected by the magnetic force.

Each of the upper separator reel 121 and the lower separator reel 122 may be a reel around which the separator 12 is wound. Also, the upper separator 1211 unwound from the upper separator reel 121 is laminated on the top surface of the center electrode 1111, and the lower separator 1221 unwound from the lower separator reel 122 is laminated on the bottom surface of the center electrode 1111. Thus, the first laminate 21 in which the lower separator 1221, the center electrode 1111, and the upper separator 1211 are sequentially laminated may be formed.

In general, slurry including a mixture of inorganic particles and a polymer binder may be applied on at least one surface of a porous polymer base material to form a porous coating layer, thereby manufacturing the separator 12. The porous polymer base material may include a polyolefin-based polymer. That is, since the separator 12 is made of a nonmagnetic material such as a polymer, the separator 12 is relatively hardly affected by the magnetic force.

The magnetic force generation part 14 generates the magnetic force by itself to apply the magnetic force to the outside. According to an embodiment of the present invention, the magnetic force generation part 14 is disposed below or above the first laminate 21 to apply the magnetic force to the first laminate 21. The first laminate 21 has a structure in which the upper separator 1211 and the lower separator 1221 are laminated on the top and bottom surfaces of the center electrode 1111, respectively. However, as described above, the separator 12 is hardly affected by the magnetic force, and the center electrode 1111 is relatively much affected by the magnetic force. Therefore, when the magnetic force generation part 14 applies the magnetic force to the first laminate 21, the magnetic force generation part 14 may attract the center electrode 1111 so that the center electrode 1111 is aligned at a regular position. On the other hand, since no attraction force acts on the separator 12, there is no change in the separator 12.

The magnetic force generation part 14 may include various kinds of magnets, but according to an embodiment of the present invention, the magnetic force generation part 14 is preferably formed of an electromagnet that generates magnetic force when current flows therethrough. The electromagnet may have a solenoid shape in which a coil is wound around an iron core. When current flows through the coil, magnetic force is generated according to Ampere's Law, and when the current is interrupted, the magnetic force is extinguished.

The first laminate 21 moves to one side by a conveyor belt or the like so that the next process is performed. Also, in the magnetic force generation part 14 according to an embodiment of the present invention, when the first laminate 21 moves to one side so that the center electrode 1111 to be aligned is disposed above or below the magnetic force generation part 14, the current flows to generate the magnetic force. Then, the magnetic force is applied to the first laminate 21 to align the center electrode 1111 to the regular position.

However, if the magnetic force generation part 14 continuously generates the magnetic force, when the first laminate 21 moves to one side to gradually approach the magnetic force generation part 14, only the separator 12 may continue to move to the one side, and the inner center electrode 1111 may be fixed by being attracted to the magnetic force generation part 14. Thereafter, the center electrode 1111 may not continue to move to the one side. Furthermore, since the plurality of center electrodes 111 move to the onside and then fixed by being attracted to the magnetic force generation part 14 while the center electrodes 111 are continuously cut, the plurality of center electrodes 111 may not move but be accumulated in the vicinity of the magnetic force generation part 14.

Thus, in the magnetic force generation part 14, when the first laminate 21 moves to one side so that the regular position at which the center electrode 1111 is to be aligned is disposed above or below the magnetic force generation part 14, the current flows for a specific time. As a result, the magnetic force generation part 14 is activated to generate the magnetic force to apply the magnetic force to the first laminate 21 and attract the center electrode 1111. Therefore, the center electrode 1111 is attracted to the magnetic force generation part 14 and then aligned to the regular position to be aligned.

If the specific time elapses after the current flows, the current is cut off. As a result, the magnetic force generation part 14 is deactivated, and the magnetic force is extinguished. Thus, since the magnetic force is applied only for the specific time, when the central electrode 1111 is aligned at the regular position, the magnetic force is extinguished after the specific time, and the central electrode 1111 moves to the one side together with the separator 12. Even if this process is repeatedly performed, and the plurality of center electrodes 1111 move to the one side together with the separator 12, all of the center electrodes 1111 may be aligned at the regular position. If the specific time is excessively long, the time for which the center electrode 1111 is attracted to the magnetic force generation part 14 and fixed is long. Accordingly, the center electrode 1111 may be separated from the regular position after being aligned at the regular position. On the other hand, if the specific time is excessively short, the magnetic force is already extinguished before the center electrode 1111 is correctly aligned at the regular position. Thus, the optimum specific time may be determined experimentally, but it is preferable that the specific time is approximately 0.01 seconds to approximately 0.5 seconds.

The apparatus 1 for manufacturing the unit cell according to an embodiment of the present invention may further include: an upper electrode reel 112 from which the upper electrode 1121 attached to an upper side of the first laminate 21 is unwound; a lower electrode reel 113 from which the lower electrode 1131 attached to a lower side of the first laminate 21 is unwound; and a laminator 15 that laminates a second laminate 22 in which the lower electrode 1131, the lower separator 1221, the center electrode 1111, the upper separator 1211, and the upper electrode 1121 are sequentially laminated.

The upper electrode reel 112 may be a reel around which the upper electrode 1121 is wound, and the upper electrode 1121 may be unwound from the upper electrode reel 112. The lower electrode reel 113 may be a reel around which the lower electrode 1131 is wound, and the lower electrode 1131 may be unwound from the lower electrode reel 113. If the unit cell 2 is the full-cell, the upper electrode 1121 and the lower electrode 1131 have different polarities. If the unit cell 2 is the bi-cell, the upper electrode 1121 and the lower electrode 1131 may have the same polarity and have polarity that is opposite to that of the center electrode 1111. If the bi-cell is the A type bi-cell, the center electrode 1111 is the anode, but each of the upper electrode 1121 and the lower electrode 1131 is the cathode. If the bi-cell is the C type bi-cell, the center electrode 1111 is the cathode, but each of the upper electrode 1121 and the lower electrode 1131 is the anode.

The upper electrode 1121 is laminated on the top surface of the first laminate 21, and the lower electrode 1131 is laminated on the bottom surface of the first laminate 21. As a result, the second laminate 22 in which the lower electrode 1131, the lower separator 1221, the center electrode 1111, the upper separator 1211, and the upper electrode 1121 are sequentially laminated is formed.

The laminator 15 laminates the formed second laminate 22. The laminator 15 may be constituted by an upper laminator 151 and a lower laminator 152 to respectively apply heat and a pressure to top and bottom surfaces of the second laminate 22, thereby performing the laminating. The electrodes and the separators of the second laminate 22 may be bonded to each other through the laminating.

Figure 3:
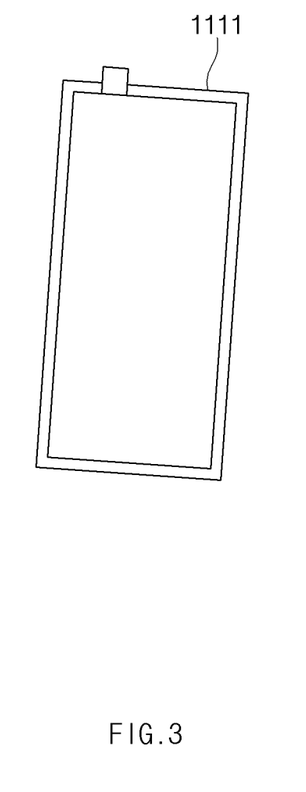
FIG. 3 is a schematic view illustrating a state in which a center electrode is separated from a regular position according to an embodiment of the present invention.
Figure 4:
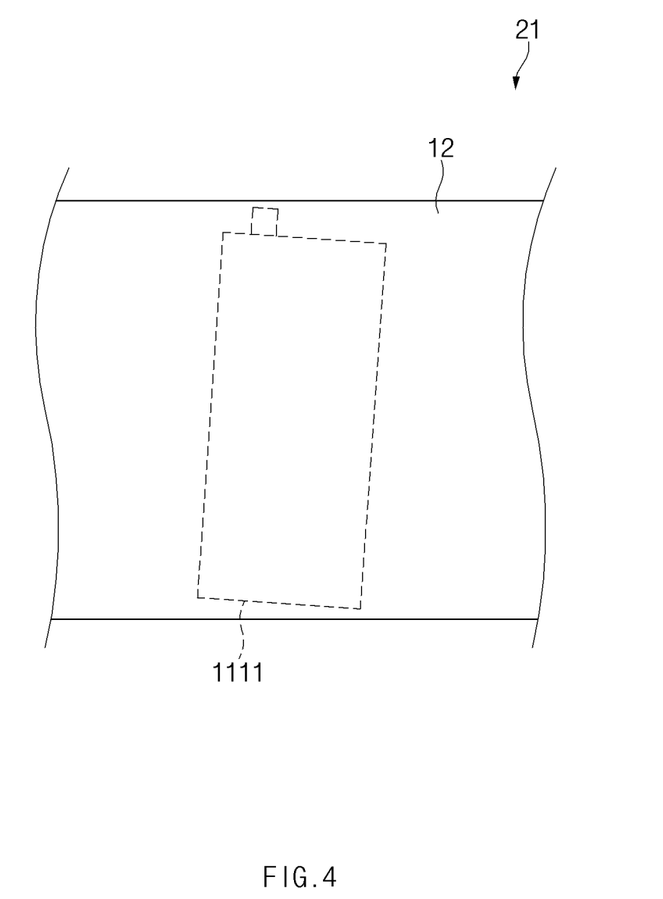
FIG. 4 is a schematic view illustrating a state in which a first laminate in which a separator is laminated on a center electrode in FIG. 3.

FIG. 3 is a schematic view illustrating a state in which the center electrode 1111 is separated from the regular position according to an embodiment of the present invention, and FIG. 4 is a schematic view illustrating a state in which the first laminate 21 in which the separator 12 is laminated on the center electrode 1111 in FIG. 3.

Hereinafter, a method for manufacturing a unit cell 2 by using the apparatus 1 for manufacturing the unit cell according to an embodiment of the present invention will be described.

First, when the center electrode 1111 is unwound from the center electrode reel 111, a first cutter 131 cuts the center electrode 1111 (S101). As illustrated in FIG. 3, the center electrode 1111 may be separated from the regular position in various steps such as the step of cutting the center electrode 1111 or the step of laminating the separator 12 on each of the top and bottom surfaces of the center electrode. Also, the cut center electrode 1111 moves to one side while being separated from the regular position.

Also, the upper separator 1211 is unwound from the upper separator reel 121 and then is laminated on the top surface of the cut center electrode 1111, and the lower separator 1221 is unwound from the lower separator reel 122 and then is laminated on the bottom surface of the cut center electrode 1111. As a result, the first laminate 21 in which the lower separator 1221, the center electrode 1111, and the upper separator 1211 are sequentially laminated is formed. Here, as illustrated in FIG. 4, since the separator 12 hides the center electrode 1111 and the center electrode 1111, it is not easy to grasp the state of the center electrode 1111 from the outside.

Figure 5:
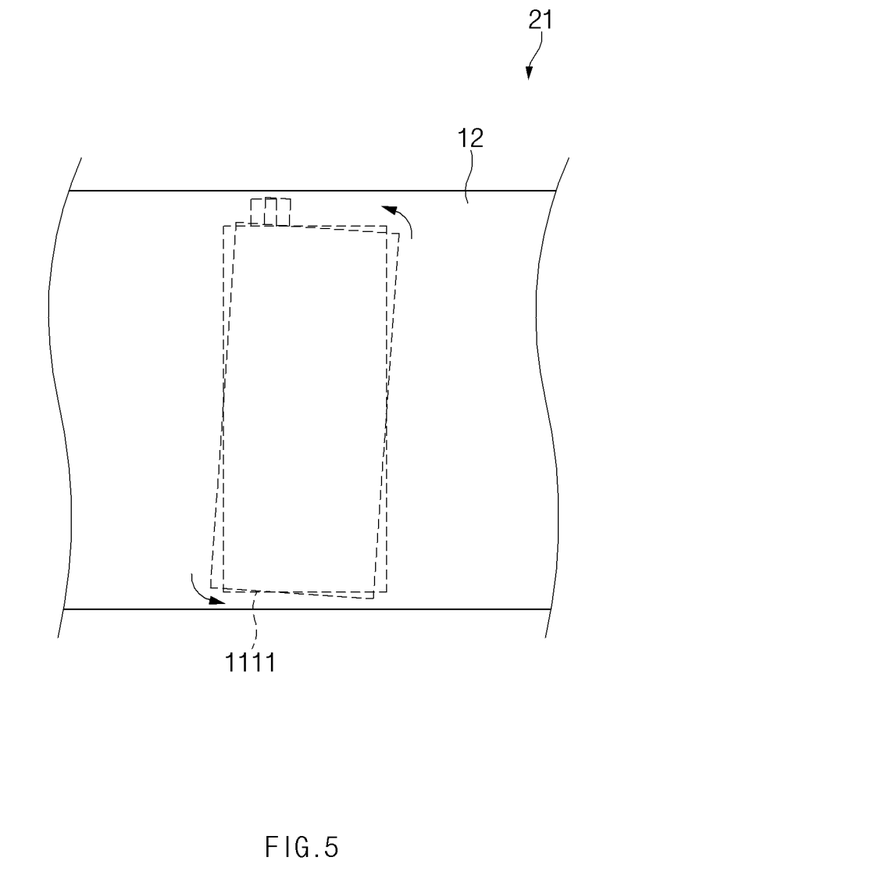
FIG. 5 is a schematic view illustrating a state in which the center electrode is aligned at a regular position in FIG. 4.

FIG. 5 is a schematic view illustrating a state in which the center electrode is aligned at the regular position in FIG. 4.

According to an embodiment of the present invention, the magnetic force generation part 14 may be disposed below or above the first laminate 21, to serve as an electromagnet that generates the magnetic force when the current flows. Thus, when the first laminate 21 moves to one side so that the center electrode 1111 is aligned above or below the magnetic force generation part 14, the current flows for a specific time through the magnetic force generation part 14 to generate the magnetic force. Also, the magnetic force is applied to the center electrode 1111, and the magnetic force generation part 14 attracts the center electrode 1111. As a result, as illustrated in FIG. 5, the center electrode 1111 may be aligned at the regular position to be aligned.

In addition, if the specific time elapses after the current flows through the magnetic force generation part 14, the current is cut off. As a result, the magnetic force generation part 14 is deactivated, and the magnetic force is extinguished. Thus, since the magnetic force is applied only for the specific time, when the central electrode 1111 is aligned at the regular position, the magnetic force is extinguished after the specific time, and the central electrode 1111 moves to the one side together with the separator 12.

Figure 6:
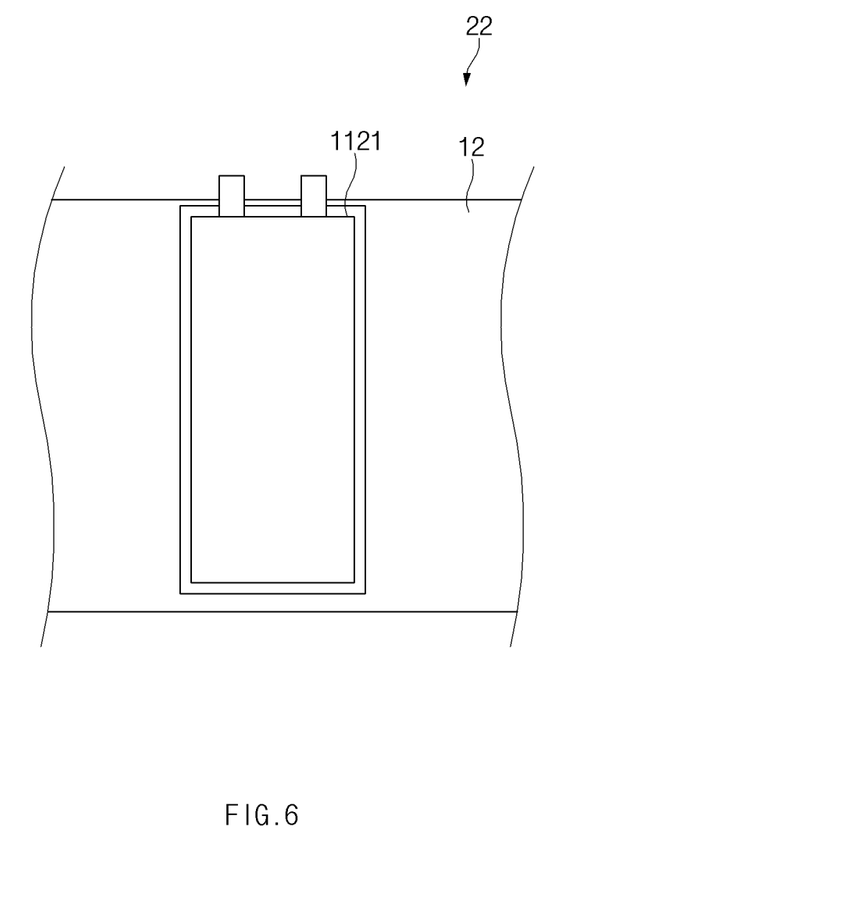
FIG. 6 is a schematic view illustrating a state in which a second laminate is formed by laminating an upper electrode on the first laminate in FIG. 5.

FIG. 6 is a schematic view illustrating a state in which the second laminate 22 is formed by laminating the upper electrode 1121 on the first laminate 21 in FIG. 5.

After the center electrode 1111 is aligned at the regular position, when the upper electrode 1121 is unwound from the upper electrode reel 112, the second cutter 132 cuts the upper electrode 1121. In addition, when the lower electrode 1131 is unwound from the center electrode reel 113, a third cutter 133 cuts the lower electrode 1131. As illustrated in FIG. 6, the cut upper electrode 1121 is laminated on the top surface of the first laminate 21, and the cut lower electrode 1131 is laminated on the bottom surface of the first laminate 21. As a result, as illustrated in FIGS. 2 and 6, the second laminate 22 in which the lower electrode 1131, the lower separator 1221, the center electrode 1111, the upper separator 1211, and the upper electrode 1121 are sequentially laminated is formed.

When the second laminate 22 moves to one side, the laminator 15 laminates the formed second laminate 22. The laminator 15 may be constituted by an upper laminator 151 and a lower laminator 152 to respectively apply heat and a pressure to top and bottom surfaces of the second laminate 22, thereby performing the laminating. The electrodes and the separators of the second laminate 22 may be bonded to each other through the laminating. As described above, the unit cell 2 may be manufactured by cutting the second laminate by using a fourth cutter 134.

Figure 7:
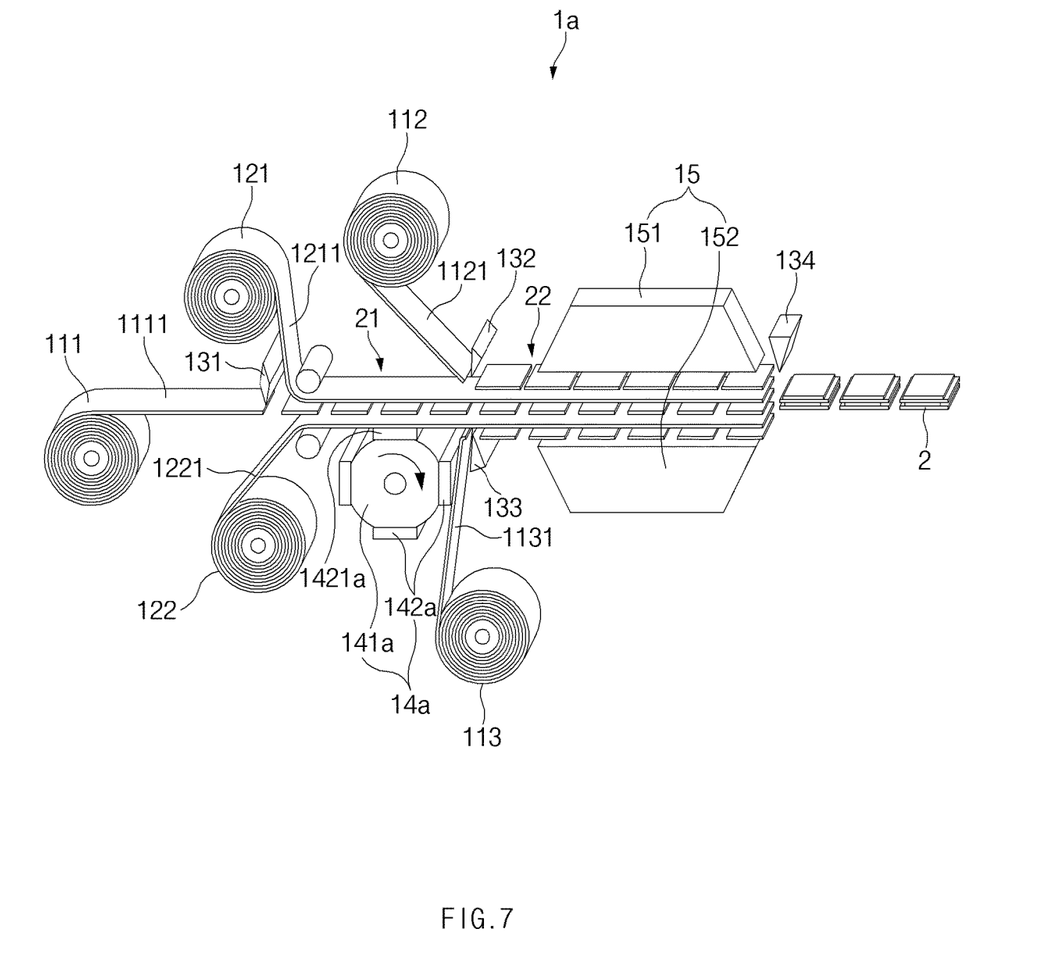
FIG. 7 is a schematic view illustrating an apparatus for manufacturing a unit cell according to another embodiment of the present invention.

FIG. 7 is a schematic view illustrating an apparatus for manufacturing a unit cell according to another embodiment of the present invention.

In the apparatus 1 for manufacturing the unit cell according to an embodiment of the present invention, the magnetic force generation part 14 may be formed as the electromagnet through which the current flows for the specific time. Therefore, when the center electrode 1111 is disposed at the regular position above or below the magnetic force generation part 14, the current flows to generate the magnetic force. As a result, the magnetic force generation part 14 attracts the center electrode 1111 to align the center electrode 1111 at the regular position.

On the other hand, in an apparatus 1a for a unit cell according to another embodiment of the present invention, as illustrated in FIG. 7, a magnetic force generation part 14a includes: a rotation body 141a that rotates and having a cylindrical shape; and a plurality of magnets 142a disposed on an outer surface of the rotation body 141a and disposed at uniform intervals.

The rotation body 141a has the cylindrical shape and is disposed below or above a first laminate 21 to rotate at a constant speed. Here, it is preferable that the rotation body 141a rotates in the same direction as a direction in which the first laminate 21 moves to one side. Thus, a rotation axis of the rotation body 141a is perpendicular to the moving direction of the first laminate 21 and is also perpendicular to a plane direction of the first laminate 21. In FIG. 7, the moving direction of the first laminate 21 is illustrated in a right direction, and the plane direction of the first laminate 21 is illustrated in an upward or downward direction. Also, the rotation body 141a preferably rotates at the same speed as a speed at which the first laminate 21 moves to the one side.

The plurality of magnets 142a are disposed at regular intervals on an outer circumferential surface of the rotation body 141a. Here, the plurality of magnets 142a are preferably permanent magnets, not electromagnets. The plurality of magnets 142a may be formed to protrude from the outer circumferential surface of the rotation body 141a, but may be formed in various manners such as being embedded. Such a permanent magnet is a magnets that always generates magnetic force and includes, for example, a general solid magnet, a neodymium magnet, a rubber magnet, a fluid magnet, and the like. Also, the interval is preferably equal to an interval between a plurality of regular positions at which the plurality of center electrodes 1111 have be aligned.

First, when the first laminate 21 moves to one side, the rotation body 141a of the magnetic force generation part 14a rotates. Here, as described above, the rotation body 141a rotates in the same direction and speed as the direction and speed in which the first laminate 21 moves to one side. Also, the interval between the plurality of magnets 142a disposed on the outer circumferential surface of the rotation body 141a is the same as the interval between the plurality of regular positions at which the plurality of center electrodes 1111 have be aligned. Therefore, when the regular position at which the center electrode 1111 has to be aligned is located far from the magnetic force generation part 14a, the plurality of magnets 142a disposed on the rotation body 141a are also located at a long distance, and thus, the magnetic force is not affected. Also, when the first laminate 21 moves to the one side to approach the magnetic force generation part 14a, the rotation body 141a also rotates so that a first magnet 1421a of the plurality of magnets 142a approaches the first laminate 21. Then, magnetic force generated by the first magnet 1421a is applied to the center electrode 1111, and the magnetic force generation part 14a attracts the center electrode 1111. As a result, the center electrode 1111 may be aligned at the regular position.

Since the rotation body 141a rotates in the same direction and speed as the direction and speed in which the first laminates 21 moves to the one side, the center electrode 1111 is aligned at the regular position by being attracted to the first magnet 1421a of the magnetic force generation part 14a to move to the one side in the same direction and speed as those of the first magnet 1421a. Here, the state in which the center electrode 1111 is aligned at the regular position may be maintained. Also, when the first magnet 1421a passes through a position of the uppermost or lowermost end of the magnetic force generation part 14a, the first laminate 21 continues to move to the one side so as to be away from the magnetic force generation part 14a, and the first magnet 1421a is also away from the first laminate 21. Therefore, after the center electrode 1111 is aligned at the regular position, the magnetic force is no longer applied to the center electrode 1111, and the first magnet 1421a no longer attracts the center electrode 1111. As a result, the center electrode 1111 may be fixed in the state of being aligned at the regular position.

As described above, when using the apparatus 1 and method for manufacturing the unit cell according to the embodiments of the present invention, in the process of manufacturing the unit cell 2, when the center electrode 1111 is separated from the regular position, the center electrode 1111 may be aligned at the regular position by using magnetic force even if it is not grasped from the outside. In addition, since the center electrode 1111 is disposed at the regular position in a non-contact manner in which contact of the center electrode 1111 is not required, the center electrode 1111 may be prevented from being damaged.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for manufacturing a unit cell of a battery, the apparatus comprising:
    a center electrode reel from which a center electrode is unwound;
    an upper separator reel from which an upper separator to be laminated on a top surface of the center electrode is unwound;
    a lower separator reel from which a lower separator to be laminated on a bottom surface of the center electrode is unwound; and
    a magnetic force generation part disposed above or below a first laminate to apply magnetic force to the first laminate, the first laminate comprising the lower separator, the center electrode, and the upper separator that are sequentially laminated.

2. The apparatus of claim 1, wherein the magnetic force generation part is provided as an electromagnet configured to generate the magnetic force when current flows therethrough.

3. The apparatus of claim 2, wherein, when the first laminate moves to one side of the apparatus so that the center electrode is disposed above or below the magnetic force generation part, the current flows through the magnetic force generation part.

4. The apparatus of claim 3, wherein, when a regular position at which the center electrode is to be aligned is disposed above or below the magnetic force generation part, the current flows through the magnetic force generation part so as to attract the center electrode.

5. The apparatus of claim 3, wherein, when a specific time elapses after the current flows through the magnetic force generation part, the current is cut off.

6. The apparatus of claim 5, wherein the specific time is 0.01 seconds to 0.5 seconds.

7. The apparatus of claim 1, wherein the magnetic force generation part comprises:
  a rotation body having a cylindrical shape; and
  a plurality of magnets disposed on an outer circumferential surface of the rotation body and disposed at uniform intervals.

8. The apparatus of claim 7, wherein the rotation body rotates in the same direction as a direction in which the first laminate moves to one side of the apparatus.

9. The apparatus of claim 7, wherein the rotation body rotates in the same speed as a speed in which the first laminate moves to one side of the apparatus.

10. The apparatus of claim 7, wherein the uniform intervals are the same intervals between regular positions at which the plurality of center electrodes are aligned.

11. The apparatus of claim 1, further comprising:
  an upper electrode reel from which the upper electrode to be laminated on a top surface of the first laminate is unwound;
  a lower electrode reel from which the lower electrode to be laminated on a bottom of the first laminate is unwound; and
  a laminator configured to laminate a second laminate in which the lower electrode, the lower separator, the center electrode, the upper separator, and the upper electrode are sequentially laminated.

12. A method for manufacturing a unit cell of a battery, the method comprising:
  cutting a center electrode that is unwound from a center electrode reel;
  laminating a separator on each of top and bottom surfaces of the center electrode to form a first laminate; and
  applying magnetic force to the first laminate from a magnetic force generation part disposed above or below the first laminate to align the center electrode at a regular position.

13. The method of claim 12, wherein the magnetic force generation part is provided as an electromagnet configured to generate the magnetic force when current flows therethrough.

14. The method of claim 12, wherein the magnetic force generation part comprises:
  a rotation body having a cylindrical shape; and
  a plurality of magnets disposed on an outer circumferential surface of the rotation body and disposed at uniform intervals.

15. The method of claim 12, further comprising:
  further laminating an upper electrode and a lower electrode on top and bottom surfaces of the first laminate, respectively, to form a second laminate.

* * * * *